United States Patent [19]
Gougoulas

[11] Patent Number: 4,587,688
[45] Date of Patent: May 13, 1986

[54] PROXIMITY DETECTOR SYSTEM FOR AUTOMATIC CAR WASHER/DRYER EQUIPMENT

[76] Inventor: Harry K. Gougoulas, 1875 Philomine, Lincoln Park, Mich. 48146

[21] Appl. No.: 707,753

[22] Filed: Mar. 4, 1985

[51] Int. Cl.⁴ ............................................. B60S 3/06
[52] U.S. Cl. ............................ 15/316 R; 15/DIG. 2; 15/405
[58] Field of Search .......... 15/DIG. 2, 312 R, 316 R, 15/405

[56] References Cited
U.S. PATENT DOCUMENTS

| | | | |
|---|---|---|---|
| 2,949,678 | 8/1960 | Anderson | 15/405 X |
| 3,442,027 | 5/1969 | Hurwitz | 15/405 X |
| 3,854,054 | 12/1974 | Conn | 15/DIG. 2 |
| 3,877,107 | 4/1975 | Cirino | 15/316 RX |
| 4,472,889 | 9/1984 | Hanna | 15/316 R X |

Primary Examiner—Chris K. Moore
Attorney, Agent, or Firm—Krass & Young

[57] ABSTRACT

Apparatus for maintaining close proximity between a vehicle surface and a forced air water stripper but without contacting the vehicle surface. A sonar detector is connected into a closed loop control system for maintaining close proximity between a Venturi type forced air outlet nozzle and the vehicle surface. Both horizontal vehicle surfaces and vertical vehicle surfaces may be treated. A novel support arm made of one or more plastic panels is also disclosed.

9 Claims, 12 Drawing Figures

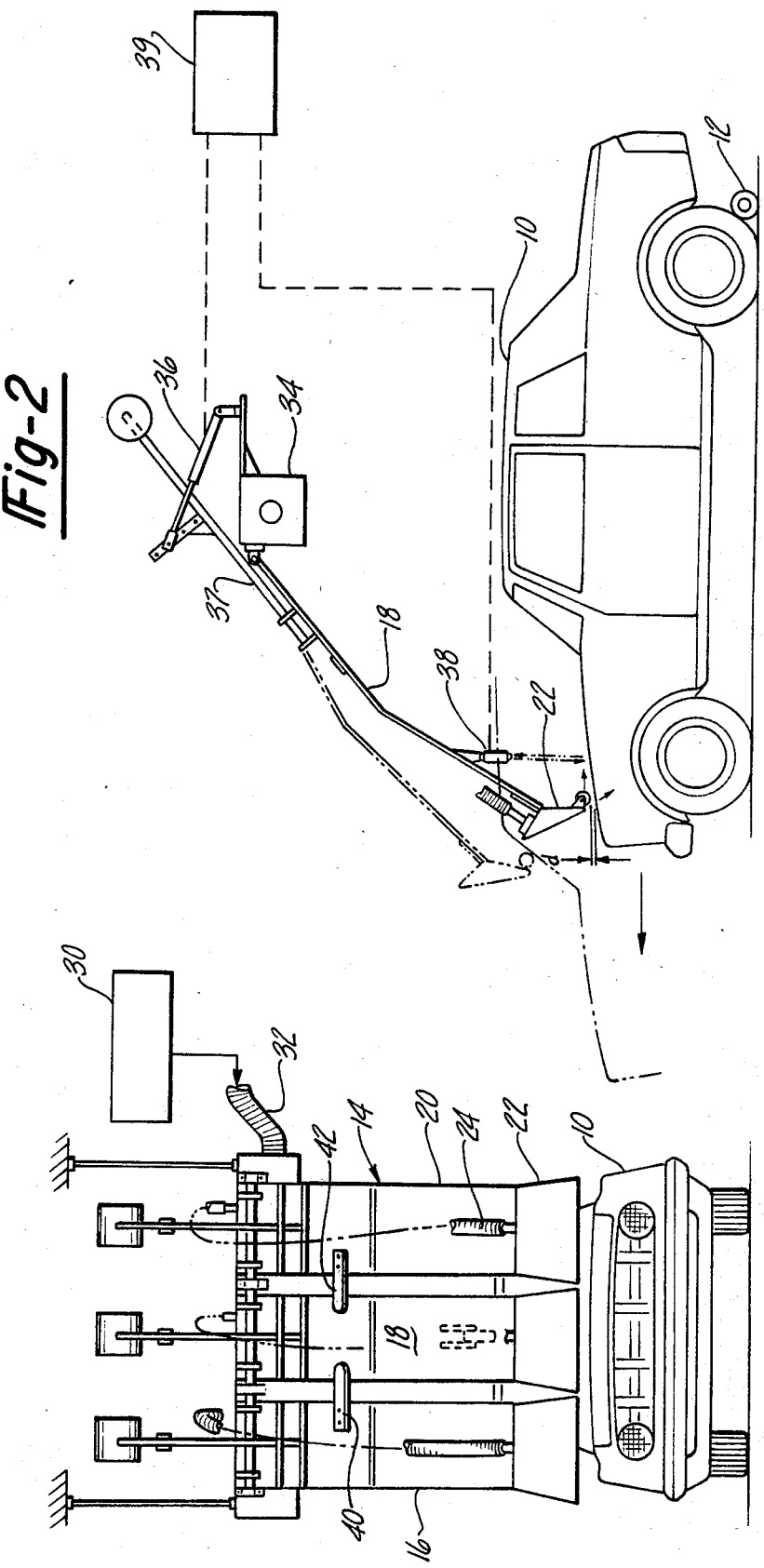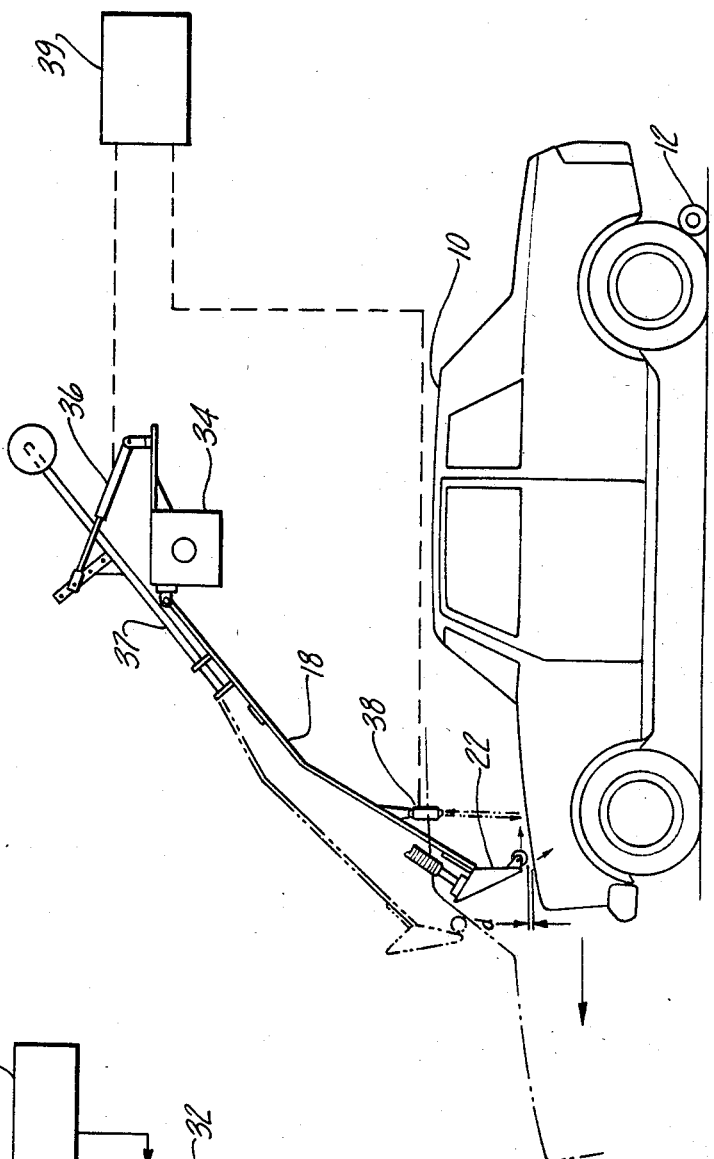

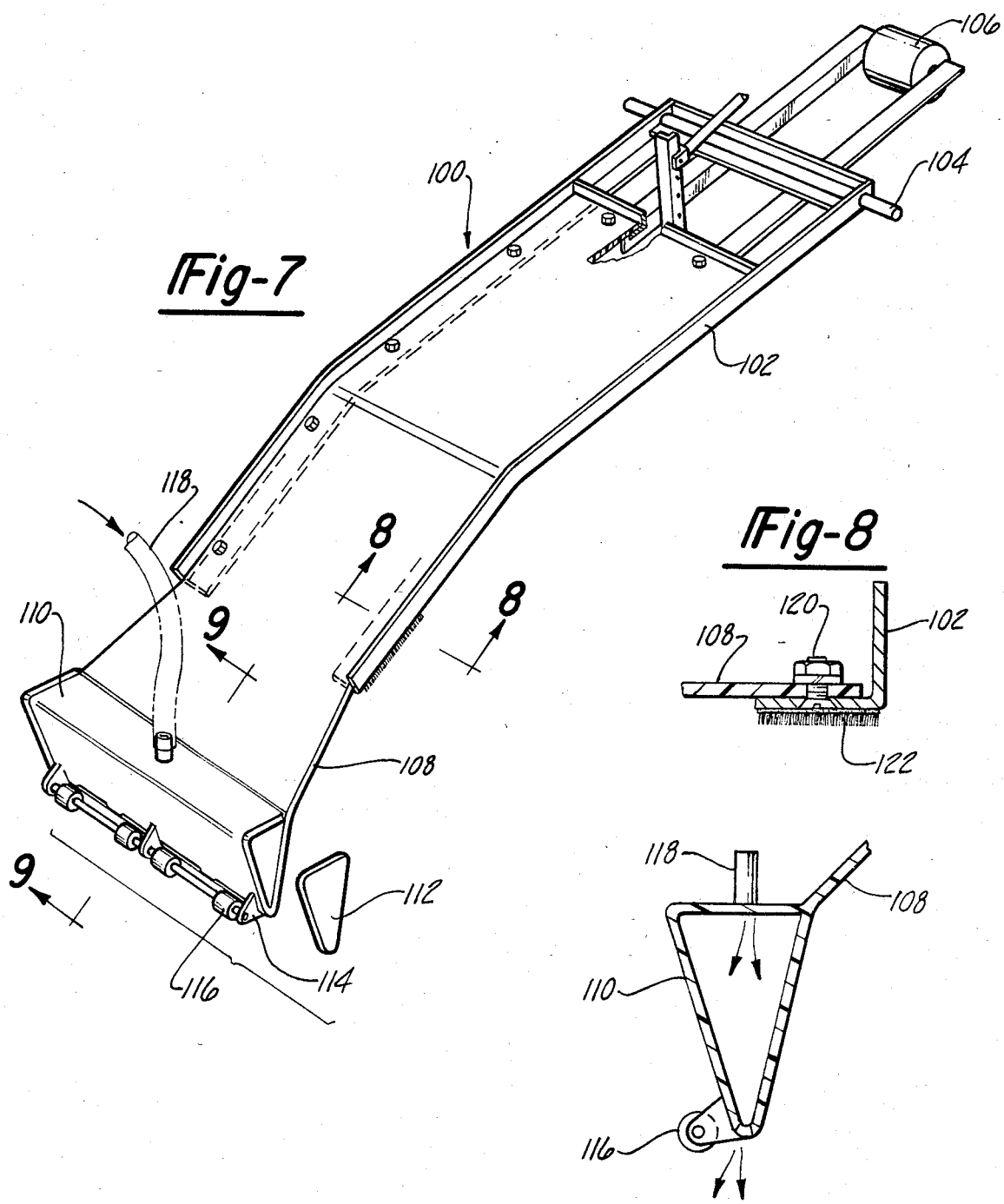

PROXIMITY DETECTOR SYSTEM FOR AUTOMATIC CAR WASHER/DRYER EQUIPMENT

DESCRIPTION

INTRODUCTION

This invention relates to apparatus for sensing the proximity of a vehicle and for adjusting the position of a washer or dryer apparatus relative to the vehicle. The invention is particularly suited to maintaining close proximity between a vehicle surface and a forced air outlet which operates a water stripper. The invention also provides a novel nozzle carrier for a water stripper.

BACKGROUND OF THE INVENTION

It is well known that washing and drying apparatus found in automatic car washing and drying operations are required to adjust vertically or horizontally to accommodate vehicles of different size as well as to follow the contours of a given vehicle. For the washing apparatus; i.e., the hanging felt strips or the rotating brushes, spring and counterweight systems are usually adequate but in some cases wands or other vehicle contacting devices may be employed.

In the case of the forced air type drying apparatus, commonly called a water stripper, both efficacy and efficient use of blower horsepower require that the forced air nozzles be kept in very close proximity to the vehicle. Accordingly blower nozzles having small plastic wheels have been mounted on the ends of relatively flexible air supply tubes. The wheels of the nozzles actually contact the vehicle surface and the vehicle itself pushes the nozzle up or sideways to accommodate the varying contours of the vehicle. For example Day et al U.S. Pat. No. 4,161,801.

It is now becoming increasing apparent that any device which contacts the vehicle is capable of marring a painted surface; i.e. the felt strip is rapidly replacing the plastic strand brush for this very reason. No satisfactory substitute for vehicle contacting devices has been found, prior to the subject invention, for regulating or adjusting the position of a washer or dryer device, particularly a forced air dryer or stripper nozzle, relative to a vehicle.

SUMMARY OF THE INVENTION

It is the overall objective of the present invention to provide an apparatus which is capable of maintaining close and accurate proximity between a vehicle washer or dryer apparatus and the vehicle surface to be treated while at the same time avoiding the necessity for contact between the vehicle sensing device and the painted surfaces of the vehicle undergoing treatment. The invention is believed to be most advantageously employed in connection with the proximity regulation of forced air water strippers used to dry vehicles which have been washed but may be applied to the regulation of other devices such as felt strip, hanger/conveyors, rotating brushes and the like.

In accordance with the first aspect of the invention a non-contacting proximity sensor such as a sonar device is suspended or otherwise disposed adjacent or in the path of vehicle travel in or through a vehicle washing or drying apparatus and such a device is oriented so as to be aimed at the expected location of the reactive vehicle surface to be sensed as it enters the treatment area. The non-contacting proximity detector is interconnected with a control system including, for example, an air cylinder to adjust the location of the detector and a vehicle treatment device mechanically co-mounted with the proximity detector so as to maintain a given spacing between the treatment device and a vehicle surface. It has been found that very close tolerance proximity may be maintained; i.e., on the order of ½ inch.

In accordance with the second aspect of the invention a novel and inexpensive nozzle and nozzle carrier design is provided. In general this comprises the use of one or more plastic panels forming an arm and an integral nozzle which has suitable air outlets for stripping water from the vehicle surface. Both full frame and frameless embodiments are disclosed.

As hereinafter described the preferred control system is arranged such that the absence of a reflected signal from the vehicle surface causes the treatment device to move, either by gravity or by spring bias, in the direction of the vehicle surface to be treated.

BRIEF DESCRIPTION OF THE DRAWINGS

FIG. 1 is a front plan view of a vertically suspended forced air water stripper incorporating the invention;

FIG. 2 is a side plan view of the apparatus of FIG. 1;

FIG. 7 is a perspective view of an improved water stripper air nozzle carrier;

FIG. 8 is a sectional view of a detail of the device of FIG. 7 taken along line 8—8;

FIG. 9 is a sectional view of another detail of the device of FIG. 7 along line 9—9;

DETAILED DESCRIPTION OF THE ILLUSTRATIVE EMBODIMENTS

Figure 3:
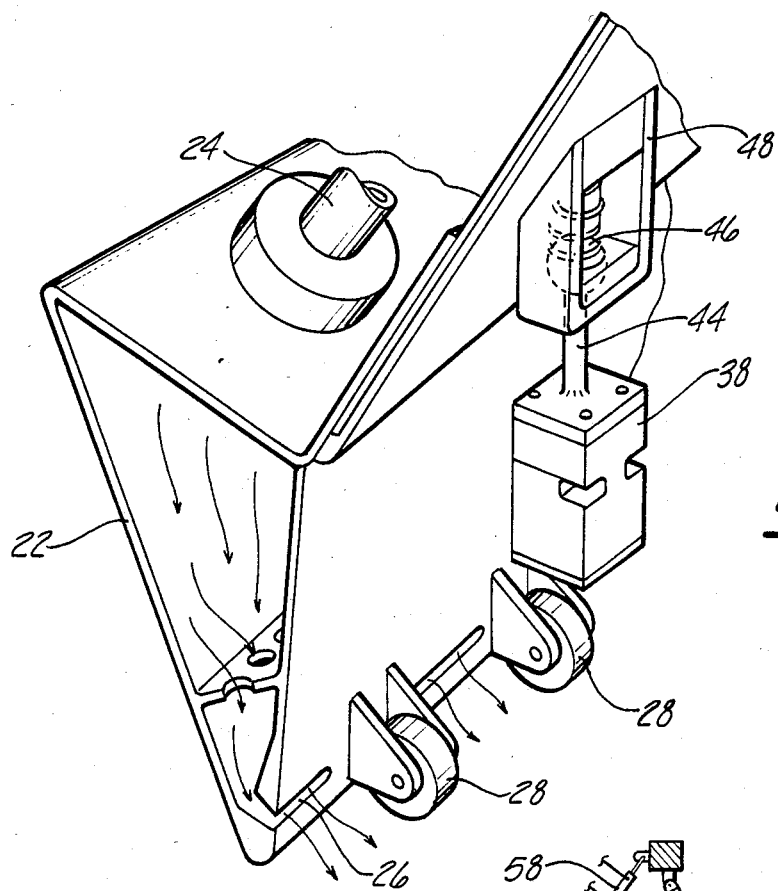
FIG. 3 is a perspective drawing of a nozzle detail and a sonar detector suspension system.

Looking first to FIGS. 1-3 a vehicle 10 is moved slowly through a wash and dry lane by means of a pusher roller 12 or other suitable conveyance where it undergoes successive wetting, washing, rinsing and drying operations. In the circumstances hereinafter described as illustrative or exemplary of the advantageous implementation and application of the invention the vehicle 10 is assumed to have been wetted, washed and rinsed and is about to enter a zone where a drying operation is carried out by forced air rinse water stripping.

A vertically depending apparatus generally designated by the reference numeral 14 is suspended from the ceiling or an intermediate support of the washer/dryer enclosure and comprises three sections 16, 18 and 20 arranged in parallel across the washer/dryer lane and approximating the width of a typical vehicle. Each of the sections 16, 18 and 20 terminates at the lower extremity thereof in a molded plastic nozzle 22 which is supplied with the forced air at a high flow rate and in high volume by means of a supply hose 24 which is connected to a plenum box 34. The box 34 receives air from a blower or turbine 30 through a trunk tube 32. Each of the nozzles 22 has a substantially continuous series of horizontal outlet slits 26 near the lower extremity thereof, the overall configuration of the nozzles 22 and slits 26 being such as to produce a chisel like sheet of high velocity air which is capable of stripping water from the surfaces of the vehicle 10 as it passes beneath the nozzle moving from right to left as illustrated in FIG. 2.

Each of the nozzles 22 is preferably provided with mounting means for small plastic wheels 28 which, as hereinafter described, are operative only during that portion of the drying cycle which corresponds to the proximity of the windshield and backlight of the vehicle 10 to the nozzle 22.

Looking particularly to FIG. 2, section 18 is shown as typical. Section 18 extends from an overhead point toward the vehicle 10 and is pivotal up and away from the horizontal surfaces of the vehicle 10; i.e., the hood, roof and trunk deck, by means of a powered air cylinder 36 connected to a rigid support arm 37. The arm is preferably counterweighted by suitable means, not shown, to give it a relatively neutral bias but slightly gravity weighted toward the lowest orientation level.

The sections 16, 18 and 20 are preferably semi-independent of one another; i.e., center section 18 is the only powered section and is interconnected with sections 16 and 20 by means of bars 40 and 42 which are rigidly connected to the sections 16 and 20 respectively so that power lifting the center section 18 away from the vehicle 10 automatically lifts sections 16 and 20 as well. However the outboard sections 16 and 20 may be lifted independently of the center section 18 to clear a mast antenna, for example. All of the sections 16, 18 and 20 fall back toward the vehicle 10 under the force of gravity but damper cylinders are provided to slow this downward movement. For example as the nozzle 22 reaches the rear extremity of the roof of vehicle 10, the sections 16, 18 and 20 then fall by gravity toward the trunk deck, the rate of fall being arrested by the damping action of the cylinders 36.

In accordance with the invention a sonar type proximity detector 38 is mounted on the support arm of section 18 where it will be approximately 12 inches from the nozzle outlet 26 measured vertically. The sonar detector projects or transmits a high frequency sonar signal toward the horizontal surfaces of the vehicle 10 and detects the distance between the sonar transmitter and the surface on the basis of elapsed time between the transmission and the receipt of a reflection. The detector 38 produces an electrical output which is proportional to the distance between the emitter or transmitter of the detector 38 and the vehicle surface which produces the reflection. A suitable device is manufactured and sold by the Control Products Division of Amerace Corporation, 2330 Vauxhall Road, Union, N.J. 07083 and is sold under the trade name "SENTINEL AGASTAT."

In accordance with the invention the proportional output of the detector 38 is connected to a control device 39 which, as will be apparent to those skilled in the electronic art, comprises an amplifier and detector, the output of which is used to control the position of a proportioning valve in the supply line to the air cylinder 36. The combination of the detector 38, the controller 39 and the air cylinder 36 forms a feedback controlled closed loop which strives to maintain the distance between the transmitter end of the detector 38 and the vehicle surface being sensed at approximately 13 inches. A reduction in the distance produces an instantaneous decrease in the detector output which, through control 39, increases the flow of air to the valve 36 thereby to lift the depending arm 37 and the section 18 away from the reflecting surface of the vehicle 10. An increase in the output of the detector due to increasing distance to the reflecting surface or due to the absence of the vehicle reduces or eliminates air flow to the cylinder 36 and allows the arm 37 to fall downwardly under the force of gravity until a mechanical stop is reached or until the signal from the detector 38 resumes.

Looking now to FIG. 3 details of the Venturi type nozzle 22 are illustrated along with the suspension details of the sonar transmitter detector 38. Non-contacting proximity detection devices such as the sonar transmitter 38 and other usable devices (e.g. infrared light transmitter/detectors) are relatively sensitive to the angle with which the transmitted signal intercepts the reflecting surface; i.e., the aforementioned sonar detector at a distance of 12 to 15 inches is tolerant of angles of incidence of up to about 15° after which the reflected signal cannot be detected. This range is sufficient to accommodate the varying angles of vehicle surfaces but cannot tolerate the angular traverse which is produced by the pivotal arm system of the nozzle support. Therefore it is necessary to provide an arrangement for maintaining the detection orientation of the detector 38 substantially independently of the position of the nozzle and its support components.

To this end the detector 38 in FIG. 3 is provided with a support rod 44 the upper end of which is connected to a ball 46 suspended in a bracket 48 which permits a universal swivel. In the arrangement of FIG. 3 the weight of the detector 38 operates with gravity to maintain a substantially vertical orientation of the detector 38 regardless of the position of the arm 18. Therefore the detector 38 does not lose its control signal as the arm is lifted to accommodate the contours of the vehicle 10 as it moves from right to left in the arrangement of FIG. 2.

Figure 4:
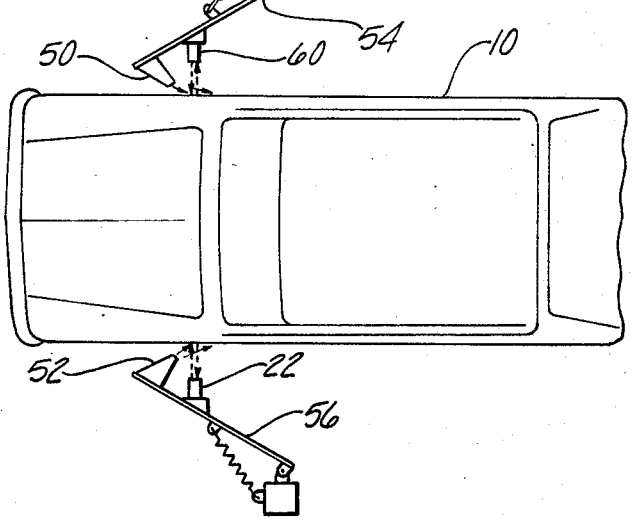
FIG. 4 is a top plan view of a horizontally adjustable water stripper system employing the invention.
Figure 5:
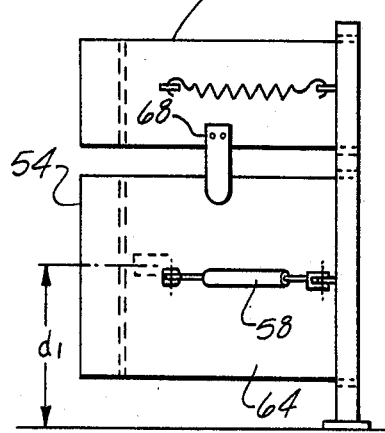
FIG. 5 is a side view of the apparatus of FIG. 4.

Looking now to FIGS. 4 and 5 there is shown an application of the principles of the invention to stripper means for the vertical side surfaces of the vehicle 10.

Nozzles 50 and 52 which are similar in configuration to nozzle 22 are mounted on the ends of rigid arms 54 and 56 respectively. Both of the arms 54 and 56 are spring biased toward the vehicle 10 but controlled in actual position by air cylinders 58 provided with suitable control systems (not shown) in the manner described with reference to Item 39 in FIGS. 1-3.

Sonar detectors 60 and 62 are mounted on arms 54 and 56 respectively to detect and maintain a given distance between the nozzles 50 and 52 and the opposite side surfaces of the vehicle 10. Although not specifically illustrated in FIG. 4 the detectors 60 and 62 are pivotal relative to the arms 54 and 56, such arrangment being provided by means of apparatus hereinafter described with reference to FIG. 6.

As shown in FIG. 5 a typical side apparatus such as 54 may be divided up into sections 64 and 66 of which the lower section 64 is the powered section i.e., is connected to the air cylinder 58. Again a bar 68 connected to upper section 66 projects into the plane of lower section 54 so that as the lower section moves away from the vehicle it carries the upper section with it. However the upper section 66 may move outwardly from the vehicle independently to clear a side view mirror for example. The upper section is connected to the biased spring 45 which in the illustrated arrangement is compressed by the action of the air cylinder; i.e., when the air cylinder pressure is relaxed, the spring tends to push the upper section toward the vehicle and the connector bar carries the lower section 64 along.

Figure 6:
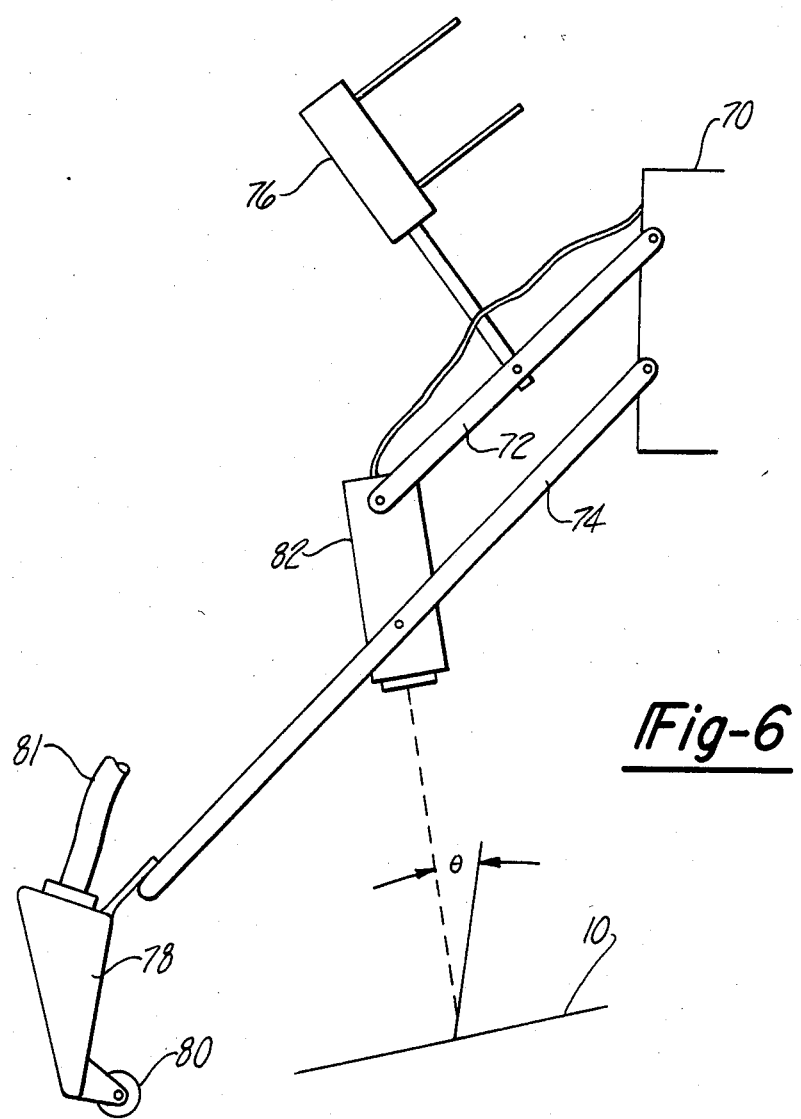
FIG. 6 is a side plan view of an alternative suspension and mounting system for a sonar detector incorporating the principles of the subject invention.

Looking now to FIG. 6 an alternative arrangement especially suited for the side mounted stripper but also usable in connection with a top mounted stripper is illustrated. In FIG. 6 the apparatus comprises a support beam 70 having pivotally connected thereto a pair of parallelogram links 72 and 74. The shorter of the two links 72 is connected to an air cylinder 76 which may be a single direction or bidirectional device according to the particular application. The shorter link 74 has connected thereto at the lower extremity thereof a nozzle unit 78 having wheels 80 and supplied with air by means of a tube 81 as previously described. Connected between the two links 72 and 74 is a sonar transmitter detector 82 which is aimed at a surface of vehicle 10 at an angle $\theta$. The angle $\theta$ is measured from a true vertical and is on the order of 5° to accommodate the modern wedge shape which typifies the vehicles of the middle '80's.

Because of the parallelogram action of the arms 72 and 74, nozzle 78 may be lifted away from the surface 10 without disturbing the angular relationship between the surface 10 and the transmitter/detector 82. This of course dispenses with the need for the swivel arrangement shown in FIG. 3 and may be considered one of several alternatives thereto.

Referring now to FIGS. 7–9, details of a first preferred stripper nozzle carrier 100 will be described. The device 100 corresponds to element 18 in FIG. 2 and comprises an open-ended box-type metal frame 102, the structural elements of which are L-shaped in cross section and may be either steel or aluminum. Frame 102 is provided with pivot pin 104 and a large heavy counterweight 106 at the mounting end. Mounted within the frame 102 is an elongate plastic sheet 108, the distal end of which is bent back on itself to form a nozzle plenum 110. The ends of the plenum 110 are sealed by caps 112 which may either be fastened or cemented in place. Tabs 114 are provided for the mounting of plastic wheels 116 for purposes previously described.

The counterweight 106 is chosen so as to nearly balance the weight of the panel 108 and frame 102 on the opposite side of the pivot 104, leaving a relatively small gravitational bias tending to lower the distal or nozzle end of the panel 108.

Air is supplied to the plenum 110 by means of a hose 118. The details of the nozzle outlets are illustrated in FIG. 9.

As shown in FIG. 8, the panel 108 is preferably fastened into the frame 102 by means of threaded fasteners 120 and a length of carpeting 122 or other suitable fabric-like material is mounted on the lower ends of the frame 102 facing the approach direction of the automobiles with which the apparatus is used thereby to prevent accidental marring or scratching should a vehicle come into contact with the metal frame 102.

Figure 10:
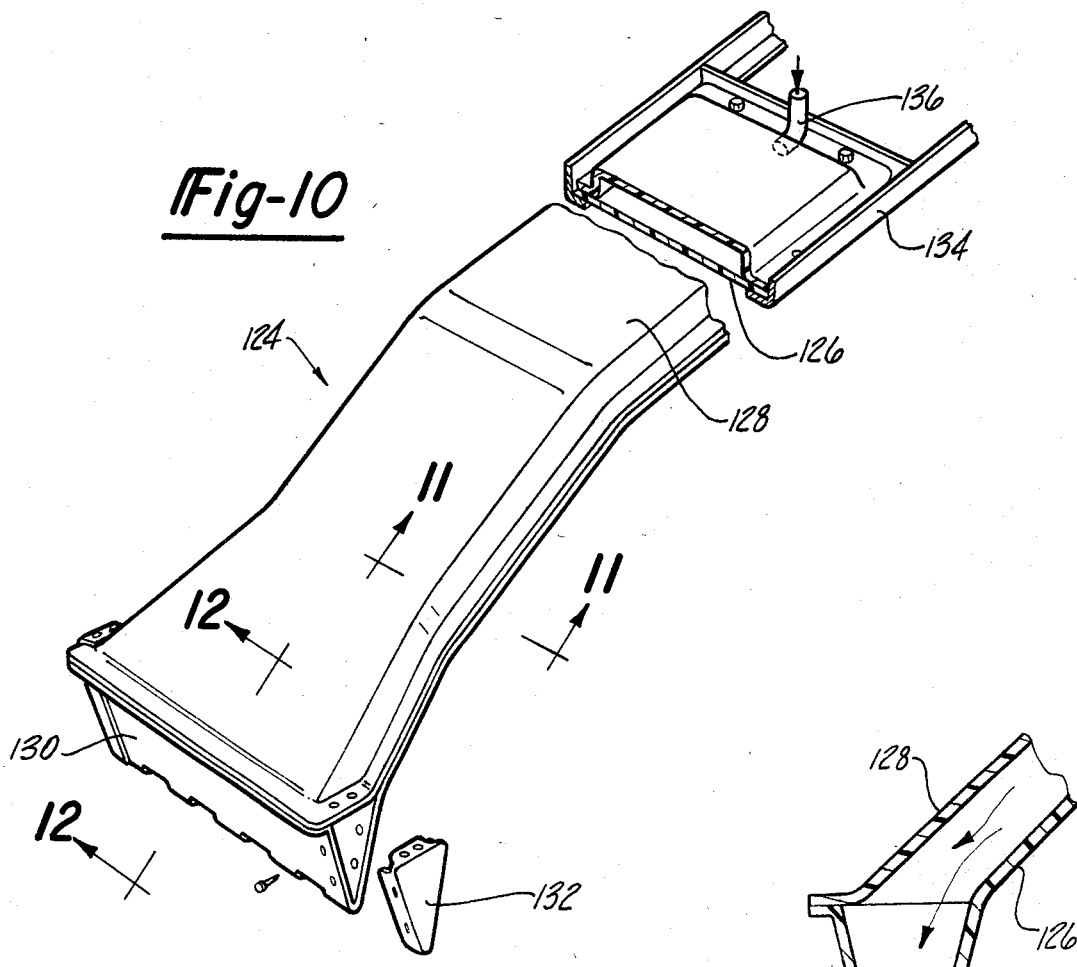
FIG. 10 is a perspective view of an alternative water stripper air nozzle carrier.
Figure 12:
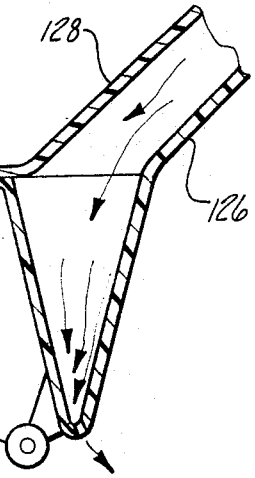
FIG. 12 is a sectional view of another detail of the device of FIG. 10 along section line 12—12.
Figure 11:
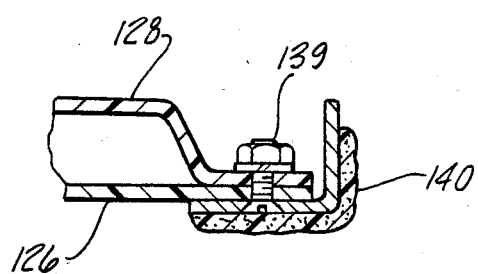
FIG. 11 is a sectional view of a detail of the device of FIG. 10 along line 11—11 thereof.

Referring now to FIGS. 10–12, a second embodiment of the nozzle carrier will be described. In this embodiment, a pivotally mountable depending carrier 124 is made up primarily of an elongate lower plastic panel 126 and a hat section upper panel 128 which are joined along edge flanges to provide a closed box section conduit which eliminates the frame of the embodiment of FIG. 7 and also provides an interior conduit or passage for air to be supplied to the nozzle.

The lower panel 126 is bent back on itself at the distal end to provide a plenum 130. End caps 132 are provided to close the plenum chamber.

For mounting purposes, a very short frame 134 of L-section frame members may be provided at the end nearest the pivot as previously described with reference to FIG. 7. An air supply hose 136 is connected into the box section combination of panels 126 and 128 at the upper end as shown.

Wheels 138 are preferably mounted on the nozzle plenum to ride over the windshield and backlight of the vehicle as previously described with reference to FIGS. 1–6. The panels 126 and 128 may also be metal.

As shown in FIG. 11, the upper and lower sections 128 and 126 respectively are joined together by means of threaded fasteners 139 which fit into holes formed in the edge flanges of the panels. Carpeting strips 140 may be adhesively secured to the lower surfaces of the panel if desired.

It is to be understood that various modifications may be made from the specific design and apparatus illustrated herein and that, for example, additional or other means may be provided for maintaining the angular relationship between the non-contacting transmitter/detector and the surface to be treated. For example, magnets may be employed to attract a freely suspended detector toward a metal surface.

I claim:

1. Vehicle surface treating apparatus such as a forced air water stripper comprising:
   a treatment device such as an air nozzle which is to be maintained in proximity to a vehicle surface, support means for said device, power means for controlling the position of said support means thereby to maintain the device in a given proximity to said surface, and non-contacting proximity detector means carried by said support means, aimed at said surface and producing an output representing the distance between said detector and said surface, said output being connected to said control means; and means for maintaining a given aiming orientation between said detector and said surface.

2. Apparatus as defined in claim 1 wherein said detector means is a sonar detector/transmitter.

3. Apparatus as defined in claim 1 wherein said orientation-maintaining means comprises a universal mount connecting said detector to said support means.

4. Apparatus as defined in claim 1 including bias means operating against said power means.

5. Apparatus as defined in claim 1 wherein said support means comprises a rigid frame and at least one panel mounted on said frame, said panel having a distal end which is bent back on itself to form a nozzle plenum.

6. Apparatus as defined in claim 1 wherein said support means comprises a hollow conduit which is substantially rectangular in cross-section and which has a mounting end and a distal end, a nozzle plenum formed at said distal end and in air flow communication with said conduit for receiving air flowing therethrough.

7. In a water stripper apparatus, a nozzle and nozzle support arm adapted to be pivotally mounted relative to a vehicle in a wash/dry lane and comprising a continuous elongate panel having a mounting end and a distal end, said panel being bent back on itself at said distal end to form a Venturi shaped air plenum having at least one air outlet formed therein, and means for supplying air to said plenum.

8. Apparatus as defined in claim 7 wherein said apparatus further comprises a frame carrying said panel.

9. Apparatus as defined in claim 7 wherein said panel is integrated into a box section air supply conduit.

* * * * *